(12) United States Patent
Schulz et al.

(10) Patent No.: US 8,791,386 B2
(45) Date of Patent: Jul. 29, 2014

(54) METHOD FOR CUTTING MATERIALS USING A LASER BEAM

(75) Inventors: Wolfgang Schulz, Langerwehe (DE); Reinhart Poprawe, Aachen (DE); Stefan Kaierle, Herzogenrath (DE); Dirk Petring, Kerkrade (NL)

(73) Assignee: Fraunhofer-Gesellschaft zur-Foerderung der Angewandten Forschung E.V., Munich (DE)

( * ) Notice: Subject to any disclaimer, the term of this patent is extended or adjusted under 35 U.S.C. 154(b) by 1546 days.

(21) Appl. No.: 11/666,386

(22) PCT Filed: Oct. 11, 2005

(86) PCT No.: PCT/EP2005/010924
§ 371 (c)(1), (2), (4) Date: Aug. 10, 2007

(87) PCT Pub. No.: WO2006/045431
PCT Pub. Date: May 4, 2006

(65) Prior Publication Data
US 2008/0000888 A1    Jan. 3, 2008

(30) Foreign Application Priority Data
Oct. 27, 2004 (DE) .......... 10 2004 052 323

(51) Int. Cl.
*B23K 26/38* (2014.01)
*B23K 26/14* (2014.01)
(52) U.S. Cl.
USPC ................ 219/121.72; 219/121.62

(58) Field of Classification Search
USPC ............ 219/121.67–121.72, 121.61–121.69, 219/121.83–121.85, 121.78–121.81; 372/26, 31
See application file for complete search history.

(56) References Cited

U.S. PATENT DOCUMENTS 5,298,716 A * 3/1994 Ogawa et al. ............ 219/121.67
(Continued)

FOREIGN PATENT DOCUMENTS

| DE | 100 12 792 A1 | 3/2000 |
| DE | 100 36 146 C1 | 7/2000 |

(Continued)

OTHER PUBLICATIONS

Boehme et al., "Handbuch der Schweissverfahren, Teil 2", Hanbuch Der Schweissverfahren, 1992, Seiten 174-175, XP002206753.

*Primary Examiner* — Samuel M Heinrich
(74) *Attorney, Agent, or Firm* — Karl F. Milde, Jr.; Eckert Seamans Cherin & Mellott, LLC

(57) ABSTRACT

This invention relates to a method for cutting materials using a laser beam, which emerges from a cutting head comprising a cutting nozzle with an inner edge, and is absorbed by the cutting front. The axis of the laser beam is displaced in relation to a workpiece along a cutting line with a fixed orientation in the cutting direction of said workpiece. In this method the position (p) of the cutting head is modulated with regard to its time averaged value, or the laser power and gas pressure in the cutting head are modulated.

26 Claims, 4 Drawing Sheets

(56) References Cited

U.S. PATENT DOCUMENTS

| | | | |
|---|---|---|---|
| 5,331,466 A * | 7/1994 | Van Saarloos | 359/723 |
| 5,565,120 A * | 10/1996 | La Rocca | 219/121.72 |
| 5,942,138 A * | 8/1999 | Toda et al. | 219/121.72 |
| 6,060,685 A * | 5/2000 | Chou et al. | 219/121.83 |
| 6,815,636 B2 * | 11/2004 | Chung et al. | 219/121.65 |
| 2001/0023527 A1 | 9/2001 | Beyer et al. | |
| 2003/0098959 A1 * | 5/2003 | Hagiwara et al. | 355/69 |
| 2006/0207977 A1 * | 9/2006 | Hermann et al. | 219/121.69 |

FOREIGN PATENT DOCUMENTS

| | | |
|---|---|---|
| EP | 0 533 387 A2 | 9/1992 |
| EP | 0 792 717 A1 | 2/1997 |
| JP | 407308792 A * | 11/1995 |
| JP | 2003305584 A * | 10/2003 |

* cited by examiner

METHOD FOR CUTTING MATERIALS USING A LASER BEAM

BACKGROUND OF THE INVENTION

The present invention relates to a method for cutting materials using a laser beam, which emerges from a cutting head comprising a cutting nozzle with an inner edge and is absorbed on the cutting front, the axis of the laser beam being moved along a cutting line with a fixed orientation in the cutting direction of a workpiece relative to said workpiece.

The cutting of a workpiece with a laser beam is an established cutting method. It assumes a leading function among the laser-supported manufacturing methods in industrial applications. One demand continuously made by the users is enhanced efficiency of the method while the quality requirements are increasing.

Essential features that must be guaranteed in fusion cutting, which includes laser beam cutting, are efficiency of the process, quality of the cut edge, ripple amplitude as small as possible, no formation of adherent drosses and no oxidation.

Likewise, shorter processing times and the high-quality cutting of large sheet thicknesses are trends in today's industrial development. Ever increasing laser performances and systems with high-quality drives are introduced into the manufacturing process.

The known techniques for cutting metals with laser radiation are subdivided, by the mechanisms involved in the input of the cutting energy, into
  laser beam cutting with reactive cutting gas jet, and
  laser beam cutting with inert cutting gas jet.

In laser beam cutting with a reactive cutting gas jet (e.g. oxygen, compressed air), the laser beam and an exothermic chemical reaction jointly provide the cutting power. Techniques for laser beam cutting with a reactive cutting gas jet are further distinguished by features as to whether the laser beam dominantly acts in the cut kerf (laser beam reactive gas cutting) or is additionally irradiated onto the upper side of the sheet (burning stabilized laser beam flame cutting).

In the case of laser beam cutting with an inert cutting gas jet (e.g. nitrogen), the laser beam provides the cutting power. Laser beam cutting with an inert cutting gas jet is further distinguished by the different mechanisms for accelerating/ejecting the melt. In addition to the cutting gas jet, the molten material may evaporate and evaporation may accelerate fusion. With an increasing advance speed the driving action is increasing due to evaporation. A distinction is made between three variants:

Laser beam fusion cutting:
  The temperature on the surface of the melt remains below the evaporation temperature and the melt is only ejected by the cutting gas jet. This variant of the method is employed in industry with thin, medium-sized and thick sheets. The melt flows out dominantly at the apex of the cutting front, in front of the laser beam axis. The formation of adherent drosses as is observed at cutting speeds that are too high or too low impairs the quality.

Fast cutting:
  The evaporation temperature is exceeded on the lower part of the cutting front, and the ejecting action due to the cutting gas and that due to the evaporating material are comparable. The melt flows out dominantly in the front portion of the cutting front, at the right and left side next to the laser beam axis. This variant can be employed in the case of thin and medium-sized sheets. The whisker formation observed at an excessively high cutting speed is detrimental to the quality.

High-speed cutting:
  The evaporation temperature is exceeded almost over the whole cutting front. The driving action due to evaporation is dominant. The melt flows around the laser beam axis and occludes part of the cut kerf following the laser beam and is there ejected by the action of the cutting gas. This variant of the method is used for thin sheets.

The prior art regarding the cutting of metals with laser radiation describes measures for optimizing the process with constantly set parameters of the laser cutting machine. Such measures aim at:
  exploiting the laser beam power as fully as possible (illumination of the cutting front) and decreasing the power losses caused by heating of material adjoining the cut kerf, and
  increasing the cutting gas efficiency to eject the melt as completely as possible.

The literature describes that the power of the laser beam is partly absorbed by the material and partly reflected. The absorbed portion is available for the cutting process and is divided into effective power and various power losses.

It is also known from the literature that in the cutting of narrow contours the cutting speed should be reduced because the acceleration of the cutting machine is limited. To avoid an undesired broadening of the cut kerf due to excessive laser power and the formation of adhering drosses or whiskers due to an excessively low cutting speed, the laser power can be modulated.

SUMMARY OF THE INVENTION

It is the object of the present invention to develop a method for cutting by means of laser radiation of the above-mentioned type in such a way that higher cutting speeds can be achieved or larger sheet thicknesses can be cut, paying attention to the quality of the cut edge, small ripple amplitudes, insignificant whisker formation and an oxide-free cut edge.

This object is achieved with a method for cutting materials using a laser beam, which emerges from a cutting head comprising a cutting nozzle with an inner edge, and is absorbed on the cutting front, the axis of the laser beam being moved along a cutting line with a fixed orientation in the cutting direction of a workpiece relative to said workpiece, the method being characterized in that the position (p) of the cutting head is modulated with respect to its time averaged value, or laser power and gas pressure in the cutting nozzle are modulated.

This method improves the conventional techniques for cutting metals using laser radiation in such a way that higher cutting speeds can be achieved or larger sheet thicknesses can be cut and any adhesion of solidified melt can be avoided. The process window for the quality cut with constantly set parameters of the cutting machine is enlarged to achieve higher speeds and/or larger sheet thicknesses. The power loss for the cut is reduced. In a special embodiment, the necessary mass flow of cutting gas is also reduced, which reduces the consumption of cutting gas and thus the costs. It has been found that the measures according to the invention achieve minor ripple amplitudes (groove amplitudes), no whisker formation or, if at all, only insignificant whisker formation and an oxide-free cut edge. It is essential that the laser radiation be absorbed in the material in cutting direction up to the lower edge of the sheet, i.e. the laser radiation illuminates the whole cutting front in the material in cutting direction, so that the whole sheet thickness is encompassed by the removal.

The above details regarding quality of the cut edge, ripple amplitude, whisker formation and oxidation shall now be explained in a few words:

Quality of the cut edge: apart from roughness and adhering drosses or whiskers and the formation of oxide layers, evenness and squareness are essential quality features of the cut edge. The process chain cutting-welding is an example that demonstrates how important the quality of the cut edge is with respect to the preparation of the joining gap. To be able to produce lean welds, which do not require any finishing work by grinding or flattening, with the laser, a cut of the components to be joined is desired with even, rectangular and smooth cut edges that are free from adherent drosses and oxide.

If possible, small ripple amplitude: especially in the lower part of the cut edge ripples with large amplitudes are formed that are created by the solidification of molten metal on the cut edge.

No whisker formation: especially at a high feed speed, the melt does not completely detach from the lower edge of the workpiece. The adhering and solidified melt forms undesired adherent drosses.

No oxidation: the formation of cracks and pores in the weld seam may be due to oxidized joining edges, as are formed in reactive gas cutting. Fusion cutting with an inert cutting gas is used for obtaining oxide-free cut edges.

In the formerly known methods, the parameters of the cutting machine are set to be constant, thereby approaching the limits for a quality cut. A targeted reduction of the convection losses is not possible with the known methods.

Depending on the thickness of the sheet, the cutting gas nozzle used, the width of the cut kerf and the material to be cut, it is possible with the method of the invention to make cuts in sheets with a greater thickness, a higher cutting speed, a lower cutting gas consumption and a higher quality.

It is important for the method of the invention that the position of the cutting head or the laser power or the plenum pressure or nozzle pressure must be modulated for enlarging the process window for the quality cut and are not, as has for far been known, set to have a constant value.

It is of advantage to the invention to provide a combined modulation of the above-indicated parameters of the cutting machine in dependence upon the material to be cut (properties of the material, sheet thickness, etc.), the laser beam used (power, intensity distribution, modulation capability), and the cutting nozzle used (round nozzle cross-section, elongated-hole nozzle, distance nozzle-upper sheet side, position of the laser beam axis in the nozzle, etc.). It is typical of the invention that power modulation alone is not advantageous, but can only be of advantage in addition to or in combination with the modulation of the other parameters.

Furthermore, it is of importance that the modulation of the position of the cutting head alone is adequate to enlarge the process window for the quality cut as compared with permanently set parameters of the cutting machine.

A time modulation of position p of the cutting head in comparison with its time averaged value is typical. With position p of the cutting head the mutually fixed positions of the axes of laser beam and cutting nozzle are changed.

Preferably, the modulation of position p of the cutting head is carried out over a sufficiently large distance $p_1$ in cutting direction that is allowed to reach at least the laser beam radius $w_0$ in the focal point and not more than the distance $A=w_D+w(z=d)$. The distance A is the sum of the distance $w_D$ between the axis of the laser beam and the preceding position of the inner edge of the nozzle and the laser beam radius $w(z=d)$ on the lower edge of the sheet ($z=d$), wherein z designates the depth in the sheet, measured from the upper edge, and wherein d is the sheet thickness.

Moreover, the position p of the cutting head is preferably moved by the distance $(-p_0)$ ($p_0<0$) in a direction opposite to the cutting direction. Distance $(-p_0)$ should here reach the value $w_D$ at the most. The sum $ds=p_0+p_1$ of the movements $p_0$ and $p_1$ correspond to the time-averaged advance movement in a modulation period.

It is essential for the method of the invention that the fusion of solid material (removal phase) and the ejection of molten material (ejection phase) take place in successive time intervals and that this time sequence is achieved by modulation of the power laser or the position of the cutting head or the gas pressure in the cutting nozzle and the modulation of the position of the cutting head. Apart from these measures taken for the basic settings, the laser power is modulated in addition and is not set to have a constant value, as has so far been the case in the prior art. In this respect the method should be modified such that in addition the laser power takes place with an almost in-phase time modulation of laser power and position p of the cutting head in comparison with the time averaged value, so that the position of the cutting head need not be moved over an unnecessarily large distance $(-p_0)$. For negative/positive values of p the laser power is controlled such that it is smaller/greater than its time averaged value.

With respect to the above procedure, the phase shift between laser power and position of the cutting head should not exceed 20% of the modulation period. This guarantees that fusion (removal phase) and ejection (ejection phase) are separated in time.

It is further of advantage to the invention when the laser power is modulated such that the minimal laser power $P_{min}$ in the rear position $p_0$ (the position during the ejection phase) has a value as small as possible and remains sufficiently large to avoid solidification of already molten material.

When the above process parameters are observed, the gas pressure in the cutting nozzle (also called plenum pressure or nozzle pressure) can be modulated. To this end the gas pressure in the cutting nozzle is modulated such that the mass flow of cutting gas flowing out of the nozzle orifice is modulated almost in opposite phase with respect to the laser power and the position of the cutting head.

This measure enhances the gain in a higher achievable mean cutting speed and the gain in larger cuttable sheet thickness, but the effect for large nozzle diameters (modulation stroke becomes too great) and large sheet thicknesses (compressibility, the time for relaxation of the gas flow rises) is decreasing. Therefore, the duration for the ejection phase should be chosen to be sufficiently long.

As for the above-indicated modulation of the gas pressure in the cutting nozzle, the deviation from an antiphase modulation between mass flow and position of the cutting head should not exceed 20% of the modulation period.

The modulation of laser power and gas pressure in the cutting nozzle may be such that laser power and mass flow of cutting gas flowing out of the nozzle orifice are modulated almost in opposite phase. This has the effect that fusion (removal phase) and ejection (ejection phase) are carried out at different times. As for this kind of modulation, the deviation from an antiphase modulation between laser power and mass flow of cutting gas flowing out of the nozzle orifice should not exceed 20% of the modulation period. This ensures that fusion (removal phase) and ejection (ejection phase) are predominantly separated in time.

To achieve a change that is as fast as possible into the ejection phase, the modulation of the mass flow at the nozzle exit by a change in the flow rate of cutting gas is of advantage.

Furthermore, the modulation of the laser power absorbed on the cutting front may be carried out through a movement of the laser beam axis along the cutting line with alternating orientation without movement of the cutting nozzle (alternating orientation means here that the position of the laser beam axis is moved back and forth). It is this very measure that enables the modulation period to assume small values because the laser beam is without mass and the inertia of a mirror is smaller than the inertia of a cutting nozzle.

When the laser beam axis is moved over a sufficiently large distance ($p_1$) in cutting direction that corresponds at least to the laser beam radius ($w_0$) in the focal point and to not more than four times the value of the laser beam radius $w(z=d)$ on the lower edge of the sheet ($z=d$), wherein z designates the depth in the sheet measured from the upper edge, and wherein d is the sheet thickness, this will yield a maximum distance over which the melt front is moved in the solid material, and illumination of the whole cutting front is ensured at the same time.

When the movement of the laser beam axis takes place by a distance ($-p_0$) (with $p_0<0$) in a direction opposite to the cutting direction, this distance ($-p_0$) being not more than two times the value of the laser beam radius $w(z=d)$ on the lower edge of the sheet ($z=d$) as a maximum, the cutting front will no longer be encompassed by the laser beam during the ejection phase.

To achieve a situation where small values can be set for the modulation period, a scanner mirror is e.g. used and the movement of the laser beam axis is performed in reciprocating or pendulum fashion. Moreover, an adequately large distance ($p_1$) and the movement of the laser beam axis by a distance ($-p_0$) on the lower edge of the sheet ($z=d$) is observed on account of the reciprocating movement. Reciprocating movement means here that the direction of the laser beam axis is changed.

Furthermore, it is of advantage to the method of the invention when the period of the modulation (modulation, particularly with respect to the position of the cutting head or the gas pressure in the cutting nozzle or the laser power) is set to have an increasingly greater value for a larger sheet thickness and a higher mean cutting speed. This stands for a larger sheet thickness or a higher mean cutting speed as compared with non-modulated cutting.

It has been found that whenever the above rules are not observed, e.g. excessively small or great values from position p of the cutting head and excessively small values $P_{min}$ of the laser power, this will lead to smaller values for the attainable mean cutting speed or cuttable sheet thickness and to incomplete melt ejection or the formation of adhering drosses or whiskers.

In the method, attention should also be paid to the time sequence of the modulation for optimizing the cutting conditions. It has been found that advantages are achievable if the modulation of the individual cutting parameters is not carried out in harmonic (e.g. sinusoidal) fashion. To this end a non-linear change in the cutting parameter is intended.

Furthermore, the modulation period should be subdivided into four time intervals $t_i$ ($i_0=1, 2, 3, 4$) with four different rates for the change in the modulation amplitude $p_{ti}$.

Of the four time intervals, the first time interval $t_1$ should represent a portion of the ejection phase, amplitude ($p_{t1}$) and duration of said first time interval ($t_1$) being set such that a cooling of the molten material is carried out by diffusion of heat out of the melt into the material to be still cut before the melt ejection gets dominant or starts.

Furthermore, with respect to the second time interval $t_2$, which represents a second portion of the ejection phase, the amplitude $p_{t2}$ and the duration of the second time interval $t_2$ should be set such that as much melt as possible is ejected and solidification of the melt is avoided.

Furthermore, the third time interval $t_3$, which represents a portion of the removal phase, is set with respect to the amplitude $p_{t3}$ and the duration such that during the ejection phase as much material as possible is fused and the laser beam illuminates the whole cutting front. This means that the melt front should be moved within as little time as possible and as far as possible into the material to be still cut. For heating the melt front at any depth as uniformly as possible, it is of advantage that the whole cutting front is irradiated by the laser beam.

The last one of the four time intervals, i.e. the time interval $t_4$, which represents a portion of the removal phase, should be set with respect to amplitude $p_{t4}$ and duration such that the removal phase will last for such a long time that the whole sheet thickness is encompassed by the removal and the increasing ejection of hot melt remains as insignificant as possible. This means that the removal action must take place over a sufficiently long period of time, so that the melt front at any depth is moved on as uniformly as possible. It is of advantage when the removal phase is completed before ejection can start in a dominant form and the melt which is then flowing out in a state getting hotter and hotter leads to an unnecessary loss of thermal energy.

It is of advantage when the impact of the controlled modulation is monitored or even the modulation parameter is controlled.

Within such a monitoring operation the thermal emission of the hot surface of the melt film is recorded with a camera. The length of the extension of the intensively shining area of the camera recordings and the intensity of the measurement signal will then be used for monitoring the beginning and the end of the different phases for the ejection of the melt and the removal or the efficiency of the control.

When the thermal emission of the hot surface of the melt film is recorded with a photodiode, the monitoring or controlling operations can be carried out with an inexpensive device, as compared with a camera, and at a higher recording frequency. The length of the extension of the intensively shining area of the camera recordings and the intensity of the measurement signal can then be sensed qualitatively also by way of a spatially averaged signal of a photodiode. The measurement values derived from this monitoring operation can then be used for controlling the four different amplitudes (Pt) and the four different time intervals (t), as indicated above.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
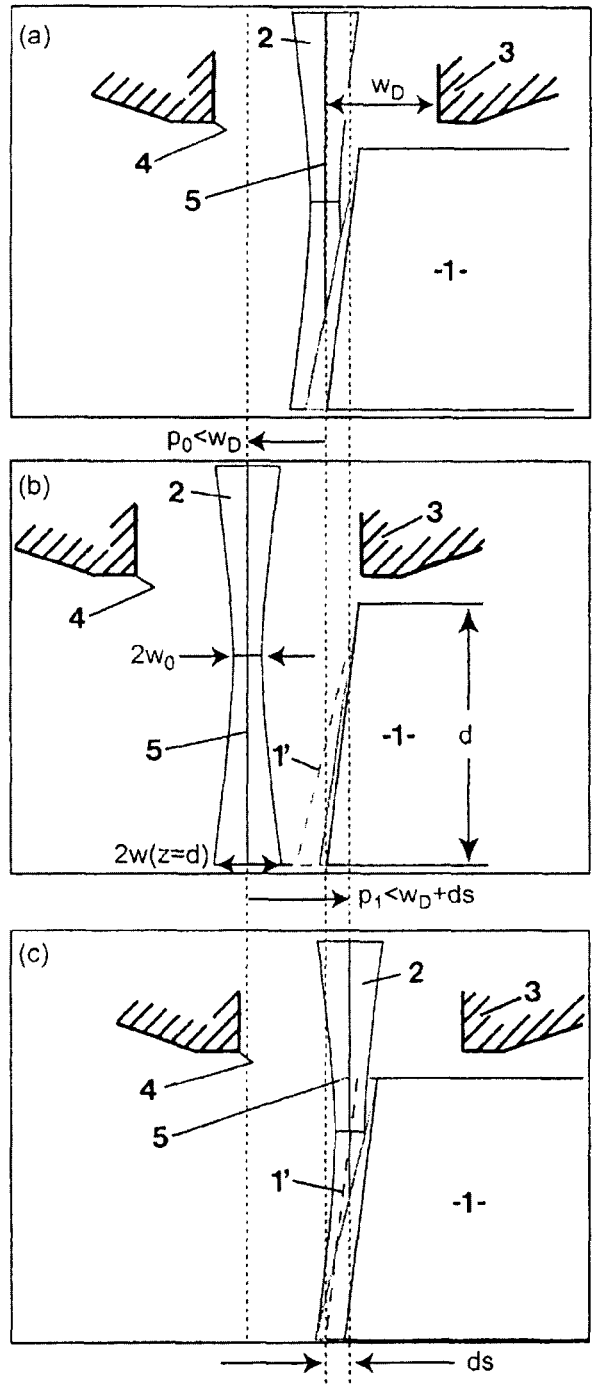
FIGS. 1(a)-1(c) show three individual pictures to explain the modulation of the position of a cutting head.

The preferred embodiments of the present invention will now be described with reference to FIGS. 1-4 of the drawings. Identical elements in the various figures are designated with the same reference numerals.

FIGS. 1(a) through 1(c) schematically show, in four phases, the modulation of the cutting head. Such a modulation of the cutting head is already sufficient for achieving an increased cutting speed and for cutting increased sheet thicknesses and for accomplishing a high-quality cut edge with little ripple or whisker formation and virtually no oxidation on the cut edge.

FIG. 1 shows the workpiece to be cut or separated with reference numeral 1. As indicated in FIG. 1(b), this workpiece 1 has a thickness d. The laser beam, designated by 2, exits out of a cutting head 3 of a laser cutting machine, which is not shown in greater detail. The inner radius WD of the cutting gas nozzle at the nozzle outlet, which is indicated in FIG. 1(a), is defined by the inner edge 4 of the nozzle. The respective position of the cutting head 3 relative to the workpiece 1 is defined by the position of the laser beam axis, which is designated by reference numeral 5.

While FIG. 1(a) shows a stationary position of the cutting head without modulation, FIGS. 1(b) and 1(c) illustrate the extreme positions of the cutting head during modulation over time. In these extreme positions, a distinction is made between the ejection phase, which is shown in FIG. 1(b), and the removal phase, which is shown in FIG. 1(c). During the ejection phase (see FIG. 1(b)), the cutting head, viewed in cutting direction, is located in a rear position, and the melt is ejected by the gas jet. In the removal phase (FIG. 1(c)), the laser beam is heating the cutting front, first at a small melt film thickness, and the melt front is moved. As to the respective phases, the time modulation of position p of the cutting head as compared with its time averaged value is characteristic. The modulation as carried out in the phases shown in FIGS. 1(b) and 1(c) should be performed at a sufficiently large distance $p_1$; this distance $p_1$ should correspond at least to the laser beam radius $w_0$ in the focal point (FIG. 1(b)) and should not be more than distance $A=w_D+w(z=d)$ (z is the depth in workpiece 1, measured from the upper edge). It is essential that the cutting head 3 is moved by a distance $-p_0$ in a direction opposite to the cutting direction. However, distance $-p_0$ must not reach a value greater than the value $w_D$. The sum ds (see FIG. 1(c)) of the movements $p_0$ and $p_1$ corresponds to the averaged advance movement in the modulation period ($ds=p_0+p_1$). At the beginning of the ejection phase (see FIG. 1(b)), the cutting front is located at the position marked with reference numeral 1'. During the ejection phase the melt is ejected almost completely. At the beginning of the removal phase (see FIG. 1(c)), the cutting front is in the position marked with reference numeral 1'. During the removal phase solid material is fused and almost no melt is ejected.

Figure 2:
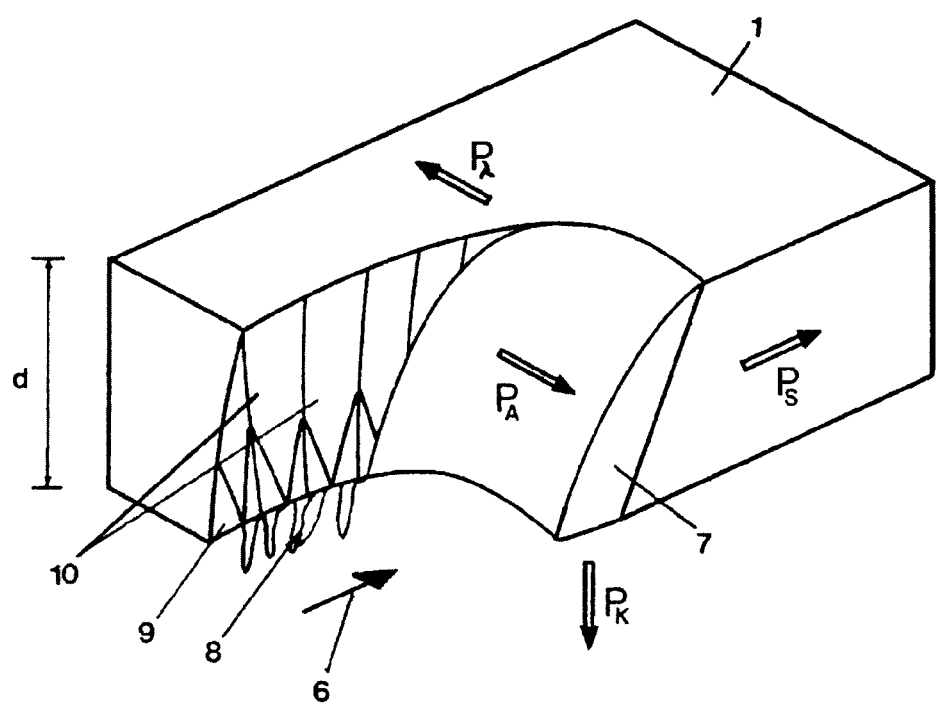
FIG. 2 is a schematic illustration of a cut workpiece.

FIG. 2 now shows a part of a workpiece 1 having a thickness d cut along the directional arrow 6 with a laser beam to illustrate the effects along the cut edge and the effective power $P_S$ as well as the power losses $P_K$, $P_\lambda$, and also the absorbed power $P_A$. The area between solid and liquid material (melt) is called melt front. In cutting direction, i.e. viewed in the direction of arrow 6, a melt film 7 located on the melt front is building up in the area of the advancing laser beam. The effective power, called $P_S$ in FIG. 2, is the power for heating and melting the material that is to be ejected. The effective power $P_S$ is the minimally required power for producing the cut kerf.

Furthermore, heat conduction losses $P_\lambda$ arise during the cutting or separating process. This regards the power for heating the material of workpiece 1 adjoining the cut kerf. This power loss remains in the cut material, reducing the effective power $P_S$.

Furthermore, convection losses $P_K$ arise. This regards the power for heating the melt to temperatures greater than the melting temperature. Said power is ejected with the melt and is again passed into the material during the cooling of adhering drosses, designated by reference numeral 8. This power loss caused by convection losses $P_K$ also reduces the effective power $P_S$.

Moreover, there are other power losses; heat radiation of the hot surface and heat transfer into the cutting or ambient gas are examples of such power losses. These power losses, however, are insignificant in comparison with the effective power $P_S$.

Furthermore, in FIG. 2 the cut edge, which is designated by 9, is provided with ripples or grooves 10. Both these ripples and the formation of adhering drosses or whiskers 8 along the cut edge are to be avoided.

As has already been stated, a nonlinear change in the cutting parameters may be provided. To this end successive modulation periods are subdivided into four time intervals $t_1$, $t_2$, $t_3$, $t_4$, as shown in the graphic illustration of FIG. 3. In these four time periods, the position of the cutting head P is changed. The positional data ds, $p_0$ and $p_1$ of FIG. 3 correlate with the data in FIG. 1.

The periods $t_1$-$t_4$ can be subdivided into a first section, the ejection phase of the melt, including the time intervals $t_1$ and $t_2$, and into a second section, the removal phase of the melt, including the time intervals $t_3$ and $t_4$.

In the ejection phase, the position of the cutting head is set such that a cooling of the molten material takes place through a diffusion of heat from the molten material into the material to be still cut, i.e. before the melt ejection gets dominant and starts (this time interval $t_1$ corresponds to the time in which the position of the cutting head is moved into the rear position (see FIG. 1(b)).

The cutting head is moved at a high speed (the amplitude $p_{r1}$ must be chosen to be large) into the rear position so that the gas jet develops its ejecting action as fast as possible and over the whole depth.

In the second part, the ejection phase, i.e. in time interval $t_2$, the amplitude and the length of time interval $t_2$ are set such that as much melt as possible is ejected and solidification of the molten material is avoided.

The removal phase starts with time interval $t_3$. In this removal phase as much material as possible should be fused, and the whole cutting front should be illuminated by the laser beam. The cutting head is moved at a high speed (amplitude $p_{r3}$ must be chosen to be large) in the cutting direction, so that the melt front is moved as far as possible and within a period of time that is as short as possible into the material to be still cut. To ensure that the melt front is heated at any depth as uniformly as possible, it is of advantage that the whole cutting front is irradiated by the laser beam.

Figure 3:
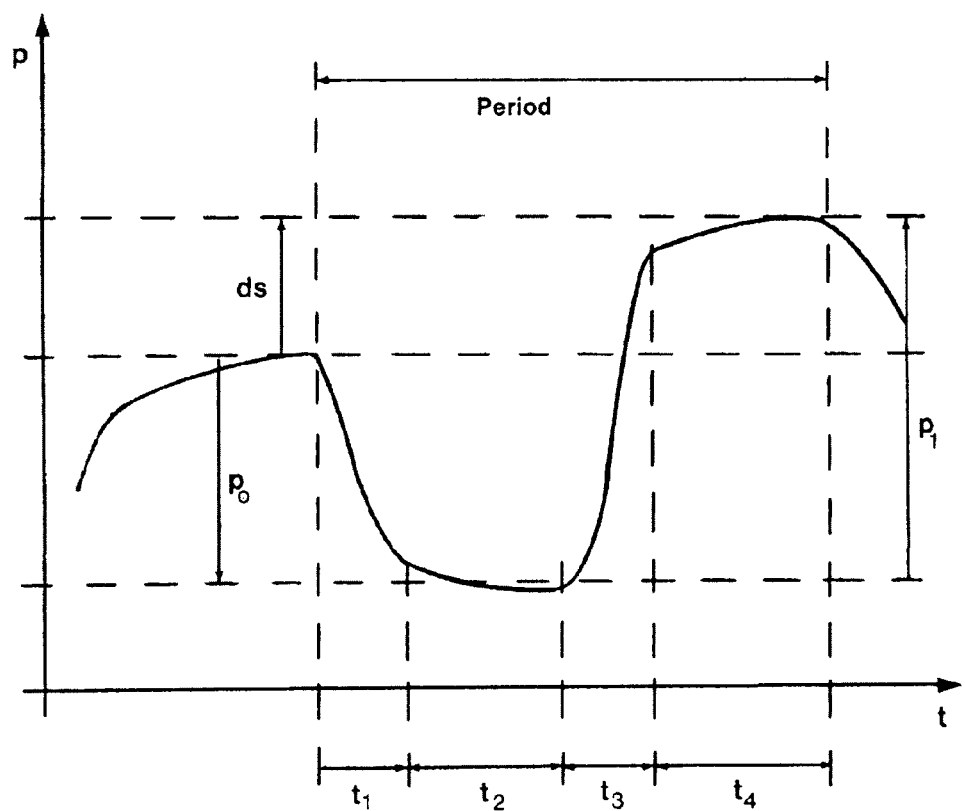
FIG. 3 is a schematic diagram showing the time curve of the modulation of the cutting head, subdivided into four time intervals.

Although the fourth time interval $t_4$, the second section of the removal phase, in which the position of the cutting head is moved at a low speed in cutting direction, should last as long as possible, this duration is limited because the increasing ejection of the melt, which is now in a hot state, should remain as small as possible. As can be seen in the illustration of FIG. 3, the speeds in time interval $t_3$ and time interval $t_4$ are different.

The effect of the above-described modulation can be monitored and the modulation parameters can also be controlled with the detected values. To this end the thermal emission is optically sensed. In its upper part, FIG. 4 respectively shows workpiece 1 with the melt film 7 and the surface of the melt film, the cutting front 1' (which is also shown in FIGS. 1(b) and (c)). The lower portion shows the intensities of the thermal emission of the cutting front during the ejection phase, corresponding to time intervals $t_1$ and $t_2$ of FIG. 3, the intensities being each time viewed from above, i.e. in a direction perpendicular to the surface of the workpiece 1. Reference numeral 11 indicates the progressive cutting of the laser beam 2. The zones designated by "1" are zones of lower intensity; the portions designated by "2" are those of mean intensity; and those designated by "3" are those of a high intensity of the thermal emission. Apart from the detection of the respective intensity of the measurement signal, which follows from the intensively shining portions, and the length l of the extension of this shining portion, these measurement results can be used for controlling the respective modulation parameter.

Figure 4:
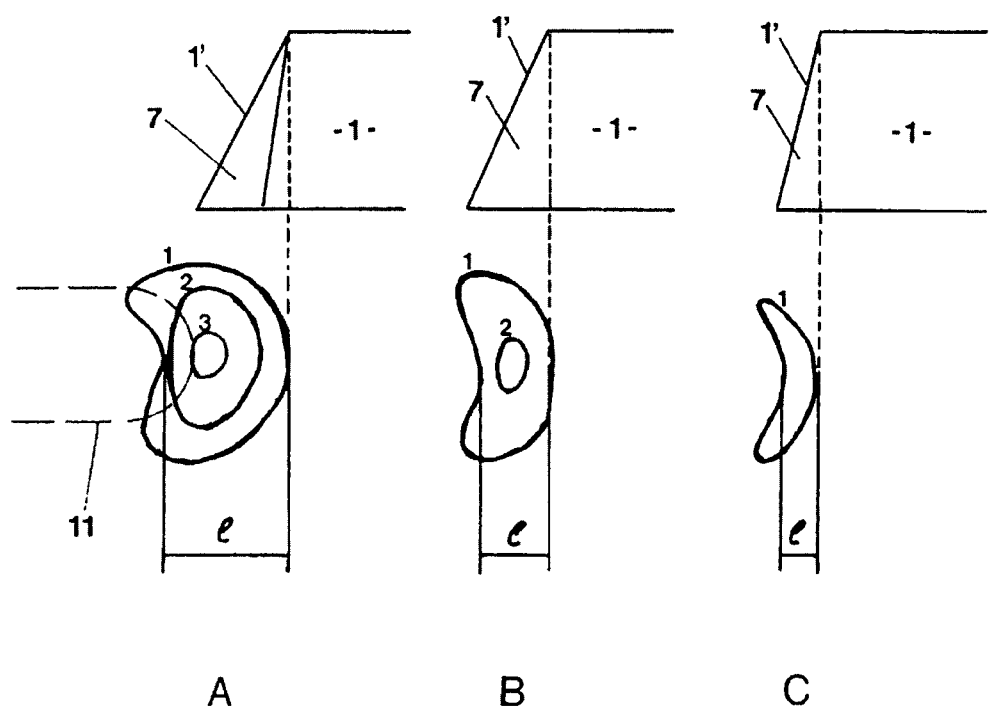
FIGS. 4A-C show three individual pictures representing the monitoring of the thermal emission from the cutting front during the ejection phase.

As can further be seen from FIG. 4, the intensity of the measurement signal and length l can simultaneously assume large/small values. That is why the effect of the used modulation parameters can be detected with a partially averaged measurement at least in a qualitatively correct way.

There has thus been shown and described a method for cutting materials using a laser beam which fulfills all the objects and advantages sought therefor. Many changes, modifications, variations and other uses and applications of the subject invention will, however, become apparent to those skilled in the art after considering this specification and the accompanying drawing which discloses the preferred embodiment thereof. All such changes, modifications, variations and other uses and applications which do not depart from the spirit and scope of the invention are deemed to be covered by the invention, which is to be limited only by the claims which follow.

The invention claimed is:

1. A method for cutting materials using a laser beam generated by a given laser power, which laser beam emerges from a cutting head comprising a cutting nozzle with an inner edge, and is absorbed on a cutting front, the axis of the laser beam being moved along a cutting line with a fixed orientation in a cutting direction of a sheet workpiece, relative to said workpiece, wherein the cutting nozzle is operated with a given gas pressure, the improvement comprising at least one of the following parameter modulating steps:
(a) modulating a position (p) of the cutting head with regard to its time averaged value; and
(b) modulating the laser power and the gas pressure in the cutting nozzle, wherein the modulation of the gas pressure in the cutting nozzle is carried out such that a mass flow of cutting gas flowing out of the nozzle orifice is modulated substantially in phase opposition to the laser power and to the position of the cutting head.

2. The method according to claim 1, wherein, in step (a), the modulation of position (p) of the cutting head is carried out over a sufficiently large distance ($p_1$) in a cutting direction that reaches at least a laser beam radius ($w_0$) at a focal point of the laser beam and at most a distance of $A=w_D+w(z=d)$, the distance A being the sum of the distance ($w_D$) between the axis of the laser beam and the preceding position of the inner edge of the nozzle and the laser beam radius $w(z=d)$ on the lower edge of the sheet (z=d), and wherein z designates the depth in the sheet, measured from the upper edge and d is the sheet thickness.

3. The method according to claim 2, wherein the position (p) of the cutting head is moved by a distance in a direction opposite to the cutting direction, said distance being not more than the value ($w_D$), which value ($w_D$) corresponds to the distance between the axis of the laser beam and the preceding position of the inner edge of the nozzle.

4. The method according to claim 1, wherein, in step (a), in addition to the time averaged value, carrying out a substantially in-phase time modulation of the laser power and the position (p) of the cutting head.

5. The method according to claim 4, wherein a phase shift between laser power and position of the cutting head does not exceed 20% of the modulation period.

6. The method according to claim 4, wherein the modulation of the laser power is carried out such that a minimal laser power ($P_{min}$) in a rear position ($p_0$) has a value as small as possible and remains sufficiently high to avoid solidification of already molten material.

7. The method according to claim 1, wherein a deviation from an anti-phase modulation between mass flow and position of the cutting head does not exceed 20% of the modulation period.

8. The method according to claim 1, wherein, in step (b), the modulation of laser power and gas pressure in the cutting nozzle is carried out such that laser power and mass flow of cutting gas per unit time flowing out of the nozzle orifice are modulated substantially in phase opposition.

9. The method according to claim 8, wherein a deviation from an anti-phase modulation between laser power and mass flow of cutting gas flowing out of the nozzle orifice does not exceed 20% of the modulation period.

10. The method according to claim 1, wherein the modulation of the mass flow at the nozzle exit is carried out by a change in a passage flow of cutting gas.

11. The method according to claim 9, wherein a modulation of the laser power absorbed on the cutting front is carried out by a movement of the laser beam axis along the cutting line with alternating orientation.

12. The method according to claim 9, wherein the movement of the laser beam axis takes place over a sufficiently large distance ($p_1$) in a cutting direction, wherein said distance has a value that is at least the laser beam radius ($w_0$) in the focal point and not more than four times the value of the laser beam radius $w(z=d)$ on the lower edge of the sheet (z=d), and wherein z designates the depth in the sheet measured from the upper edge, and wherein d is the sheet thickness.

13. The method according to claim 9, wherein the movement of the laser beam axis takes place by a distance in a direction opposite to the cutting direction, said distance being not more than two times the value of the laser beam radius $w(z=d)$ on the lower edge of the sheet (z=d).

14. The method according to claim 9, wherein the movement of the laser beam axis takes place in reciprocating fashion, and the sufficiently large distance and the movement of the laser beam axis by a distance on the lower edge of the sheet are observed through the reciprocating movement.

15. The method according to claim 1, wherein, in at least one of steps (a) and (b), a period of modulation is made increasingly larger for larger material thicknesses and higher average cutting speeds.

16. The method according to claim 1, wherein, in at least one of steps (a) and (b), the modulation is carried out through a nonlinear change in the modulating parameter.

17. The method according to claim 16, wherein a period of modulation is subdivided into four time intervals ($t_1$, $t_2$, $t_3$ and $t_4$) at four different rates for the change in a modulation amplitude ($p_{ti}$).

18. The method according to claim 17, wherein a first time interval ($t_1$) represents a portion of an ejection phase, wherein amplitude ($P_{t1}$) and duration of the first time interval ($t_1$) are set such that molten material is cooled by diffusion of heat out of a melt into material to be still out before an ejection of the melt becomes dominant or starts.

19. The method according to claim 17, wherein a second time interval ($t_2$) represents a second portion of an ejection phase, with amplitude ($p_{t2}$) and duration of the second time interval ($t_2$) being set such that as much melt as possible is ejected and a solidification of the melt is avoided.

20. The method according to claim 17, wherein a third time interval ($t_3$) represents a portion of a removal phase, with amplitude ($p_{t3}$) and duration of the third time interval ($t_3$) being set such that during the removal phase as much material as possible is fused and the laser beam illuminates the cutting front as a whole.

21. The method according to claim 17, wherein a fourth time interval ($t_4$) represents a portion of a removal phase, with amplitude ($p_{t4}$) and duration of the fourth time interval ($t_4$) being set such that the removal phase will last until the sheet has been removed in its entire thickness and an increasing ejection of hot melt remains as small as possible.

22. The method according to claim 21, wherein thermal emission of a hot surface of melt film is recorded with a camera and wherein a length (l) of the extent of the intensively shining portion of camera recordings and an intensity of a measurement signal of the intensively shining portion are used for monitoring a beginning and an end of at least one of (1) phases for ejection and subsequent removal of the melt, and (2) an efficiency of control.

23. The method according to claim 21, wherein a thermal emission of a hot surface of the melt film is averaged and recorded.

24. The method according to claim 23, wherein a thermal emission of the hot surface is recorded with a photodiode.

25. The method according to claim 17, wherein measurement values deriving from the monitoring operation are used for controlling the respective length of the four different time intervals ($t_1$) and for controlling an amplitude of the respective time interval, wherein the amplitude is defined as the speed with which the cutting head is moved.

26. The method according claim 15, wherein, in step (b), a period of the modulation of the laser power and the gas pressure in the cutting nozzle is set to become increasingly longer for larger material thicknesses and higher average cutting speeds.

* * * * *